Jan. 7, 1930. T. MIDGLEY 1,742,777
METHOD AND APPARATUS FOR INCORPORATING CORDS IN RUBBER SHEETS
Filed June 30, 1921 2 Sheets-Sheet 1
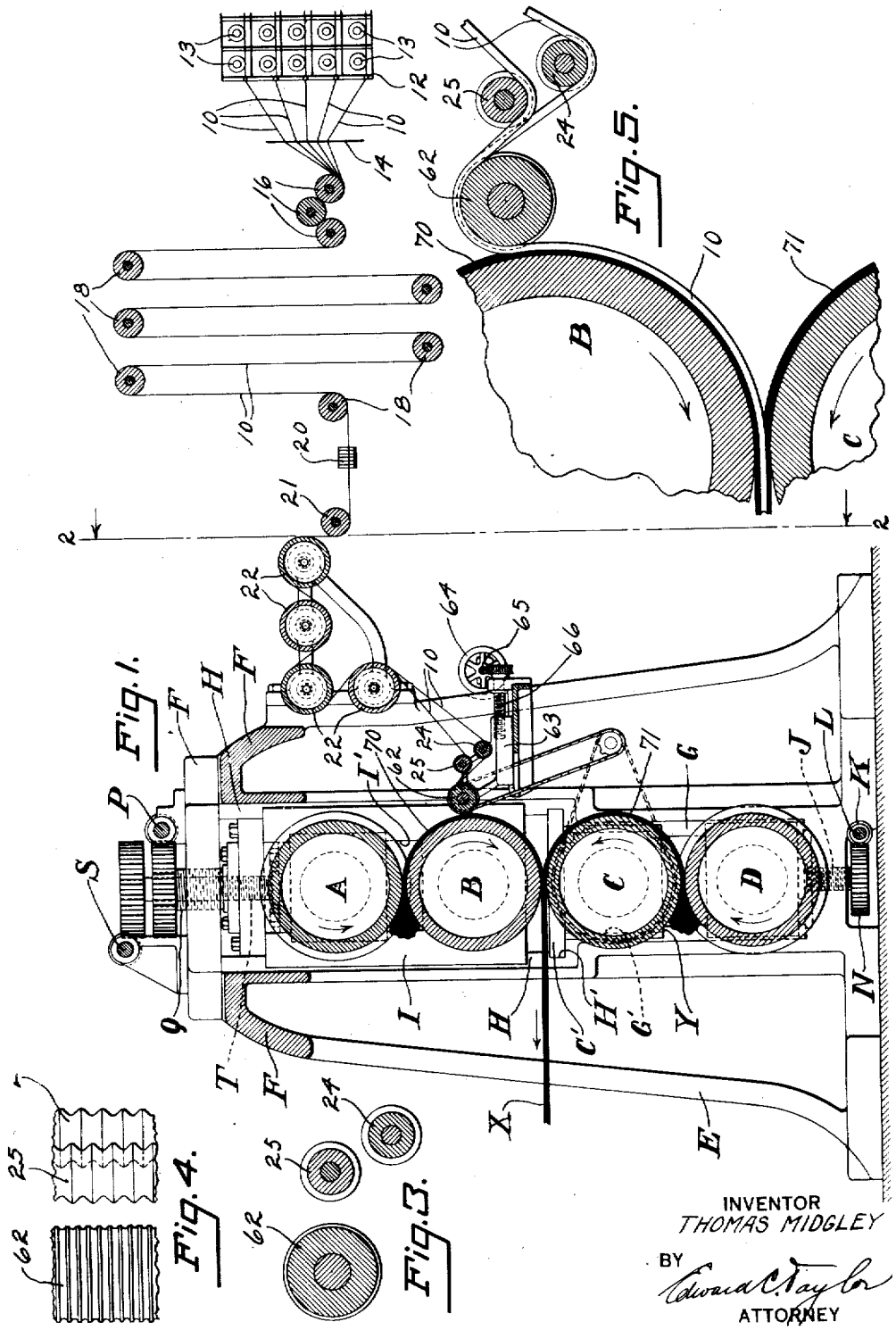
INVENTOR
THOMAS MIDGLEY
BY
Edward C. Taylor
ATTORNEY Jan. 7, 1930.  T. MIDGLEY  1,742,777
METHOD AND APPARATUS FOR INCORPORATING CORDS IN RUBBER SHEETS
Filed June 30, 1921  2 Sheets-Sheet 2
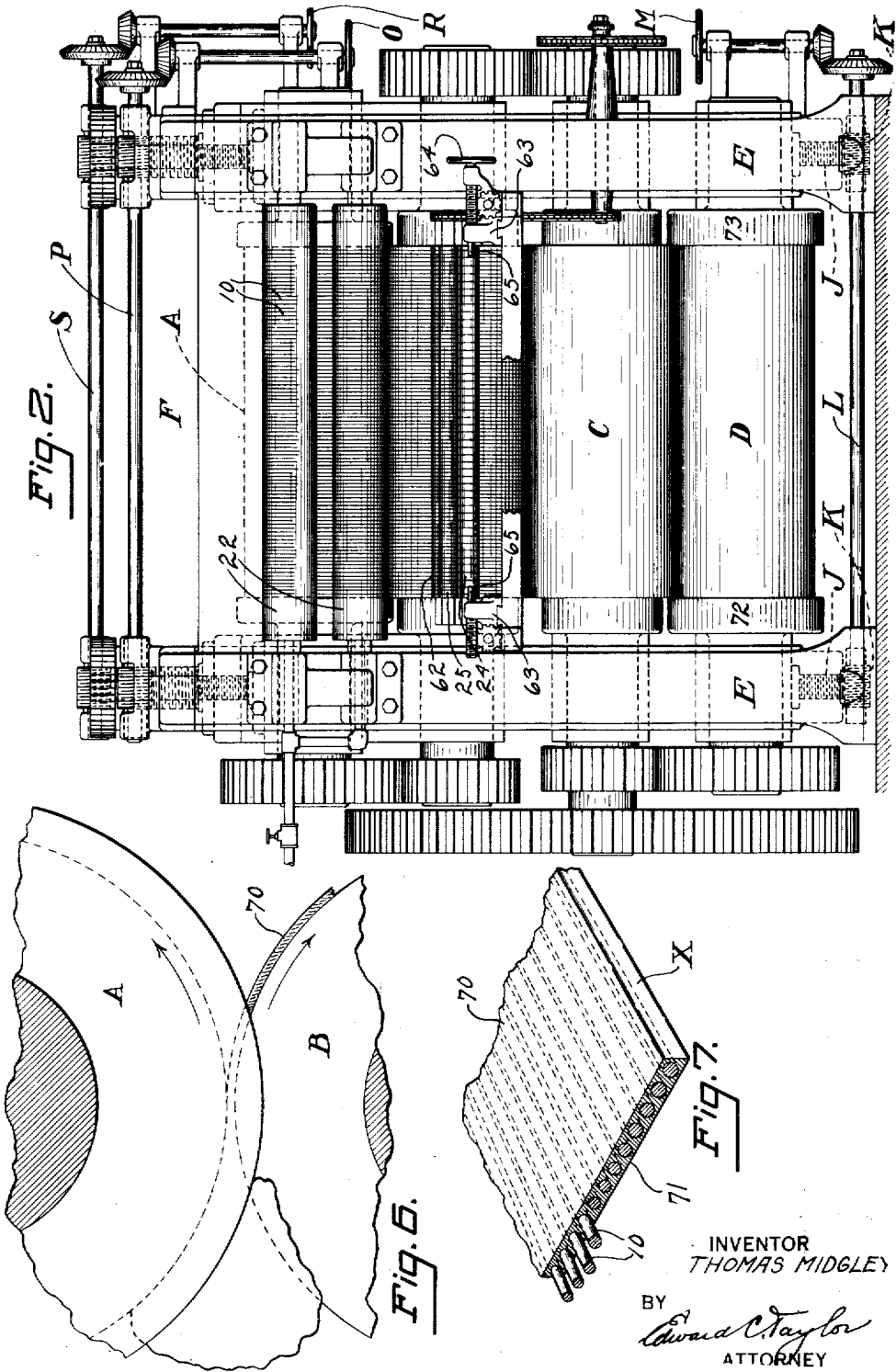
INVENTOR
THOMAS MIDGLEY
BY
Edward C. Taylor
ATTORNEY Patented Jan. 7, 1930

1,742,777

UNITED STATES PATENT OFFICE

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS

METHOD AND APPARATUS FOR INCORPORATING CORDS IN RUBBER SHEETS

Application filed June 30, 1921. Serial No. 481,549.

This invention relates to an improved method and apparatus for incorporating parallel cords in rubber sheets. One of the most important features of the invention is the one by which the cords and rubber are made to adhere in the finished product.

There are many reasons why it is important and difficult to obtain the desired accurate proportion and arrangement of cord and rubber in sheet form. It is important because laminated articles like cord tires need to be built with the cords for strength and the rubber for protection to the cords and for resiliency in use. The proportion of cord to rubber and the arrangement of cord with rubber are, therefore, factors which must be considered in building tires and other laminated articles of the two materials. The nature of the original step in bringing the rubber and cord together is important because in subsequent operations of building cord tires, for example, every care should be taken to properly place the material to do its work, and it will be apparent that unless the rubber and cord are properly associated in their original incorporation one with another, subsequent operations on the two materials as a unit will fail to correct the error.

The adherence of the cord and rubber in the finished product is of prime importance. If the rubber easily pulls away from the cords it does not make much difference how they were originally incorporated because the product is then defective. The adhesion of cord and rubber is difficult principally because the two materials do not have an affinity one for the other. For various reasons I desire to obtain superior adhesion of the cord and rubber without any reliance upon the usual methods of frictioning or solutioning the cord.

According to one of the principal objects of this invention, I join the cords to the rubber while the cords and rubber are both hot. The cords are preferably so hot as to make momentary contact with the workman's hand uncomfortable but not hot enough to make a burning contact. This illustration is intended as a preferable range of temperatures. The temperature of the cords when they join the rubber on a calender should be high enough to get the desired superior adhesion in the product when cool. I am aware of the general practice of heating cords or fabric before joining them with rubber but this practice has been for the purpose of drying the cords or fabric. The drying temperature is substantially less than the temperature desired for my purpose. To obtain the full advantage of this feature of my invention it is necessary to have the cords and all the rubber which is to directly adhere to them in the finished product contact while the cords are hot as stated. This contact is preferably brought about on a calender where rolling pressure insures good and complete original contact. If the cord is arranged in fabric form the positioning of the cords is not so important or difficult a problem as where the cords are unconnected except by rubber in the finished product.

According to another one of the principal objects of this invention, I join the cords to the rubber in the desired spaced parallel relation so as to attain a predetermined proportion within very close limits between the rubber of the sheet and its cords. In addition, I control within important limits of accuracy the gauge of the rubber on one or on both sides of the parallel cords as well as the amount of rubber between the cords so that the composite sheet produced by my method can be made conveinently of predetermined character with respect to the uses intended for it.

The combination of the two features of heating the cords for the desired ultimate adhesion of the rubber and of joining the rubber to the cords when the latter are in proper relative position for permanent setting in the rubber is another principal object of the invention. Other objects of my invention will appear in the description of the improved apparatus indicated in the accompanying drawing.

Fig. 1 is in part a diagrammatic view of a creel and cord feeding means and in part of a complete calender apparatus in section showing the guiding, heating and applying devices between the creel and calender.

Fig. 2 is a face view in the direction of the arrows from line 2—2, Fig. 1, of a four roll calender apparatus upon which the cord and rubber may be originally joined by pressure.

Fig. 3 is a section detail view showing the preferred arrangement of grooved rolls for guiding the cord in its application in parallel relation to the rubber on a calender roll.

Fig. 4 is a plan view of the grooved rolls shown in Fig. 3.

Fig. 5 is a detail view of the grooved rolls shown in Figs. 3 and 4, but in their relation to the calender rolls showing how the cord is preferably joined to the rubber on the rolls.

Fig. 6 is a detail of the calender roll arrangement for sheeting out the rubber.

Fig. 7 is a perspective view of a composite sheet of cord and rubber such as can be produced by this invention.

Referring to Fig. 1, cords 10 from spools 13 on creel 12 are led through guides 14 over stretching rolls 16, around tension equalizing rolls 18, through an expanding comb 20, guide roll 21, and then over a series of cord heating rolls 22, the purpose of which will be specially described. From the heated rolls the cords pass alternately to grooved rolls 24 and 25 and then to a grooved roll 62, by the aid of which the cords are applied to the rubber sheeted out on a calender, all preferably in a manner to be specifically described.

The calender I prefer to use in carrying out my invention is of special construction, all as specifically set forth in my co-pending application S. N. 488,263 filed July 29, 1921, Patent No. 1,500,679 July 8, 1924, although other types of calenders can be used as will appear. I will refer to the preferred construction of the calender sufficiently to make the present invention entirely clear in its preferred application in use.

The calender frame E comprises two vertical standards spaced apart to support the calender rolls A, B, C and D. These standards are connected across the top by the cross frame piece F, all of which are of heavy and rigid construction as indicated. The frame standards E are each provided with two sets of vertical guides G and H, the latter being offset from and wider than the former as shown in Fig. 1. The guides G also have auxiliary guides G¹ for rigidly mounting the bearing blocks of roll C as will be described later. The bearing blocks for rolls C and D are mounted to engage guides G, while a movable frame block I is mounted one in each frame standard E to engage guides H and support the bearing blocks for rolls A and B, while providing a central forked opening having supplemental guides I¹ to receive rolls A and B and provide for vertical adjustment of the roll A within the frame block I. With this arrangement it will be clear that the roll C may be mounted rigidly in place by having its bearing blocks engage guides G¹, the lower edges of the blocks resting upon shoulders Y at the lower ends of guides G¹ and being held firmly in place by cross-bars C¹ driven or placed across the upper faces of said blocks and into notches H¹ at the lower ends of guides H. The roll D is mounted for vertical adjustment on guides G. The roll B is fixed in the bottom of frame blocks I so as to move therewith while roll A is mounted for vertical adjustment with respect to frame blocks I by means of its bearing blocks' slot and guide connections with the supplemental guides I.

In order to vertically adjust the position of roll D with respect to roll C, roll B with respect to roll C, and roll A with respect to roll B, all adjustments being independent one of the other, the following arrangement is made. A suitable hand wheel M (see Fig. 2) is arranged to turn cross shaft L and with it the worms K, engaging the worm wheels N at the lower end of the vertical supporting posts J screw threaded into the lower ends of frame standards E. The top of these posts J engage and support the bearing blocks of roll D so that turning the posts J one way and the other will raise and lower roll D in the frame. In an analogous manner the turning of hand wheel O (see Fig. 2) will turn shaft P and the hollow shafts Q screw-threaded into the frame part F and having attached to them at their lower ends the frame blocks I, but with permissible rotary movement between hollow shafts Q and blocks I where the latter are attached. The roll B is adjusted with respect to roll C as the frame blocks I are thus equally moved in guides H. By turning hand wheel R (see Fig. 2) the shaft S will be turned and through it and the worm and worm wheel connections the shafts T are turned. The latter pass through the hollow shafts Q and are respectively screw-threaded to the removable top pieces of frame blocks I and support from their lower ends the bearing blocks of roll A in the same manner as shafts Q support the frame blocks I. The roll A is adjusted with respect to roll B as the frame blocks of roll A are guided by the supplemental guides I. By the structural arrangement and adjustment described, it will be seen that the operator may with great convenience control the gauge of the rubber sheets formed between rolls A—B and C—D, or either of them, all particularly for a purpose to be described. Also the distance apart or relation of rolls B and C is likewise conveniently adjusted by the turning of one hand wheel O.

The grooved roll 62 is mounted to rotate in spaced arms extending toward roll B from the slide 63. The latter is movable toward and away from the roll by turning hand wheel 64, which rotates shaft 65 having gear connection with adjusting screws 66 threaded to the slide 63, all of which is supported suitably upon the calender frame as indicated. The slide 63 also carried in suitable bearings and back of grooved roll 62 the grooved rolls 24 and 25, the purpose of which will be explained.

The calender rolls are driven from a suitable source of power through the large gear on the shaft of roll C (see Fig. 2) and rolls A, B and D are driven through suitable gear connections between the rolls, all as indicated in the drawings or by other convenient means to get the proper and usual relative speeds between calender rolls in accordance with the work they are to perform. As indicated by the gearing, rolls B and C rotate at the same speed, but rolls A and D at slightly lower speed so as to properly sheet out the rubber.

The grooved roll 62 is preferably driven positively at the same peripheral speed as roll B by chain and sprocket driving means from roll C arranged as indicated in Fig. 1 to permit movement of roll 62 toward and away from roll B without interfering with the driving means.

The rubber is sheeted out between calender rolls A—B and C—D from "feeds" or banks of rubber placed in the bights of these respective pairs. The calender rolls are heated as is usual, and the calendered sheets of rubber 70 and 71 are formed according to general practice except for one unique feature, particularly useful in the present invention.

The roll D is provided with enlarged end or side portions 72 and 73 which overlap the roll C provided at each side or end with reduced portions to receive the enlarged ends of roll D (see Fig. 2). The working portions of rolls C—D intermediate said end portions are of a width corresponding to the width of the composite sheet of cord and rubber to be made. In sheeting out rubber between rolls C—D the sheet normally tends to spread over the whole width of the rolls and the arrangements described limits the sheet to the desired width as it is formed. The enlarged portions 72 and 73 of roll D acting against the shoulders of roll C accomplish this purpose and the dimensions of the shoulders and enlarged portions 72 and 73 are made sufficient for the purpose. The rolls A—B are formed at their sides in the same manner as rolls C—D as indicated in Fig. 2 and for the same purpose with respect to controlling the desired width of sheet 70. The advantage of this arrangement will be more specifically referred to in the detailed description of the way to practice the method invention in its preferred form.

It is desired by this invention to form a composite sheet of cord and rubber as indicated in Fig. 7 and one having the cords 10 joined to rubber sheets 70 and 71 with good adhesion, with the cords spaced in parallel relation with dependable accuracy one from another, with the rubber of sheets 70 and 71 joined one to another between the cords, with the cords and rubber joined together in as nearly homogeneous a manner as possible, and with the desired predetermined proportion of cord to rubber in the composite sheet. Certain of the advantages in the invention may be obtained without the others. A description of the invention in its preferred application will make its various phases clear.

The feature of the invention by which superior and continued adhesion between the cord and rubber is obtained is found in the application and functioning of the heated rolls 22 conveniently mounted to rotate in bearings mounted on the calender frame. As indicated in Fig. 1 these rolls may be hollow or of any usual steam heated type within which steam may circulate to maintain the desired degree of temperature. The speed of the cords over the heated rolls, the number of heated rolls, the temperature of the heated rolls, and such factors should be arranged so as to transfer enough heat to the cords to have them real hot when they meet the rubber on the calender. It is not at all sufficient for my purpose to heat the cords enough to dry them, although that much heat gives me the incidental and acknowledged advantage of drying the cords. Nor is it sufficient for my purpose for the cords to acquire their heat by passage with the hot rubber through the calender. What I accomplish by increasing the heat in the cords beyond the drying temperature is to have them hot enough at the time they meet the rubber on the calender and pass with it between the calender rolls so that the rubber will continue to adhere to the cords when the composite sheet is cold as well as when it is hot. It is also desirable to apply all the rubber which is expected to adhere to the cords by direct contact, while the cords are hot as stated. For this reason I choose to apply the rubber to both sides and between the cords on a four roll calender in substantially one operation. While I have emphasized the particular application because of its particular importance of the rubber to cords unconnected by weft threads or woven arrangement this feature of my invention can be applied with a large advantage to square woven, weak weft, or other fabric as distinguished from parallel unconnected cord arrangements. By the general application of this feature of heating the fabric sufficiently just before the rubber is applied under pressure less reliance need be had on solutioning processes, dangerous on account of fire risk and frictioning processes objectionable on account of the distortion of whatever cord arrangement is frictioned.

The illustration of the apparatus in Fig. 1 in its essential features is an example of an apparatus to carry out my invention. Referring to this figure a specific example will be given for a better understanding of the invention. I have found in practice that if cords 10 (of a size regularly used in cord tires today) are fed in parallel relation, as close together as twenty-three to the inch, over the four heating rolls 22 and at a speed required by the normal calender speed in practice sufficient heat will be transferred to the cords if the steam pressure in the four hollow rolls 22 is approximately fifty pounds. This degree of heat will give quite remarkable results in causing a better adhesion between cord and rubber. This adhesion is better when the composite sheet is cold as well as after it is vulcanized. This specific example is given only for the purpose of illustrating what the invention involves and how it is radically different from the prior art methods of joining cord and rubber.

Referring now to Fig. 1 every other one of the cords 10 arranged in parallel relation under equalized tension and while hot from rolls 22 are fed to grooved roll 24 and the other cords 10 are fed to grooved roll 25 and then all the cords are fed to grooved roll 62. The grooves of roll 24 are in line with alternate grooves of roll 62 and the grooves of roll 25 spaced from roll 24 are in line with the intermediate grooves of roll 62. It is a preferred operation to separate the cords 10 as by rolls 24 and 25 and then lead them to roll 62. This operation, performed immediately adjacent their point of application to the rubber, insures against one cord being in position to crowd or ride over an adjacent cord either just before or as the cords meet the rubber sheet. The difficulties avoided by this feature of invention arise particularly in preparing composite sheets of rubber and cord for cord tire manufacture where common practice requires the parallel cords to be as many as 20 more or less to the inch.

The grooved roll 62 guides the hot cords in their exact proper relation and condition to the hot rubber sheet 70. It preferably presses the cords directly into the sheet and holds them therein by means of the position of the roll as readily determined and fixed by the operation of the hand wheel 64. This arrangement presses the cords into the sheet as they meet it between the bight of roll B and roll 62. The arrangement of the roll 62 and the fact that it is grooved places the cords on and in the rubber sheet and holds them there against any lateral shifting. The original contact of the cords and rubber travelling at the same speed, while both are hot and while the cords have their desired relation one to the other and to the rubber, occurs at a time when the best conditions prevail for the desired adhesion and permanent set between the two. The meeting point of the cords and rubber sheet 70 is preferably made at a sufficient distance along the arc or surface of roll B from the bight between rolls B and C, to insure a substantial hold by the pressure of the cords against roll B as they travel with it. This prevents lateral movement of the cords as they meet the second sheet of rubber 71 in the bight of rolls B and C. The cords are thus pressed into sheet 70 and the rubber of this sheet is pressed between spaced cords. When the cords and sheet 70 meet the rubber sheet 71 between rolls B and C the elements of the composite sheet are all preferably travelling at the same speed. There is just enough pressure between these rolls to join the sheets 70 and 71 between the spaced cords and to insure by contact the adhesion between sheet 71 and the heated cords. The two sheets of rubber thus become one homogeneous sheet except where the cords are, but the rubber of the one sheet surrounds and adheres to all the spaced cords. The composite sheet of rubber and cord is thus made up of an essentially integral structure with the different elements in the desired predetermined proportion and position in the sheet.

I prefer to obtain the sheet X in the manner described. If for any reason it is desired, however, to friction the cords, sheet 70 and the cords are first joined as described. The roll C is then properly driven with respect to roll B to apply the rubber sheeted out between rolls C and D as a friction coat upon the bare side of the cords held in sheet 70 on roll B as a support, feeding to the frictioning roll C. Of course, the necessary changes in the relative speeds for the calender rolls will need to be made, all of which is understood. If desired for any reason, the cords may be embedded in the rubber sheet 70 without a skim or friction coat being applied between rolls B and C. The skim or friction coat may be applied on another calender or by rerunning through the same calender. It is far more preferable, however, to get the rubber and cord together in one operation when uniform conditions can exist and be adequately controlled as in the description of the preferred form.

One of the important features of the invention is the initial application of the cords to the rubber as by the application of the cords by roll 62 to sheet 70, or by their equivalents under the conditions suitable for initiating and maintaining the desired relation and proportion of the composite sheet. While I have described roll 62 as pressing the cords directly into the sheet 70, said roll may be spaced slightly away from the sheet provided there is not enough of a gap of unsupported cords between the two to permit one cord shifting laterally with respect to another. In either case the primary pressure to cause the cords to contact with the rubber is a rolling pressure against the cords. The support of the cords by grooved roll 62 and their tension and contact against sheet 70 around a sufficient arc of roll B has a marked effect in preventing lateral shifting of the cords from the relative positions as they leave the grooved roll. These various arrangements and other equivalent ones are all within the operations of my invention broadly. The roll 62 need not be positively driven but may be turned by the travel of the cords themselves or even held stationary and good results will follow in some instances in practice.

I have described and I prefer the arrangement specifically shown as a means of best carrying out the invention. The pressure of the roll 62 against roll B, its positive drive, its location away from the bight of rolls B and C, its sets of alternate grooves fed by supplementary grooved rolls 24 and 25, the application of the sheet 71 to the cords, and the heating of the cords, all contribute to avoid the shifting of the cords when or after they meet the rubber and to overcome the lack of affinity between cord and rubber and thereby join the two together properly and in the right position and proportion. By the practice of my invention a crew of ordinary calender men may start the operation and judge and readily control the production of sheet X substantially as a regular calender operation. It is often important to have the rubber gauge right on each side of the cords as well as for the composite sheet as a whole and to have the rubber equally distributed on both sides as well as between the cords. Laminated structures can then be made up from the material resulting from this invention without particular care or study in distributing the rubber equally between laminations as by turning the sheets.

As the finished sheet X leaves the calender rolls its edges do not need to be torn away from any excess rubber on the sides of the calender rolls because the enlarged portions of rolls A and D have limited the width of the rubber sheet, all as previously described. This is important because such a tearing away would displace the cords at the edges of the sheet.

Whenever it is desired to change the proportion of cord and rubber in the composite sheet X, the grooved roll 62 and rolls 24 and 25 can be replaced by others having the desired spacing of grooves and the desired shoulders between grooves, which determine the amount of rubber between cords. These shoulders or teeth between grooves may be slightly crowned or pointed (as shown in Fig. 4) so as to induce the cords to drop into the right grooves and to prevent them passing over from one groove to another. The proportion of rubber and the final pressure in forming the sheet is of course controlled by the hand wheels, M, O and R, which adjust the relation of adjacent calender rolls.

By completing the whole composite sheet in what amounts to one operation a great advance is made in accurately proportioning, as well as joining, the elements of the sheet. This is so because the rubber and cord will join together better in one operation than in successive operations in which the factors of heat, pressure, stock, adjustment, etc., have a material influence on the product but can not be made identical or in proper proportion to preceding operations.

By joining the rubber and cord under rolling or other uniformly applied pressure while the cords are real hot superior adhesion results particularly in these important aspects. The adhesion between cord and rubber is greatly improved when the composite sheet is cold or at normal temperature. In tire building the sheets or tire building elements of cord and rubber split from the sheet need to be subjected to the tire building operations. These involve stresess and strains and friction of various sorts and for the most part at a time when the rubber carried by the cord is unvulcanized and at normal temperatures. The operations tend in many instances to pull the rubber away from the cord. Proper adhesion between cord and rubber will prevent any actual breaking away of one from the other. After the cord and rubber produced or associated by my invention is subjected to the vulcanizing operation there is a superior bond between the two of very substantial proportions. This is so because the vulcanizing operation acts to fix or set the bond to a degree directly proportional to the bond obtaining before vulcanization. While vulcanization is normally carried on under substantial pressure and temperatures such pressure can not be uniformly applied to all parts of the cord and rubber. For this reason it is most desirable that a superior and a direct bond between the rubber and all the cords be obtained and maintained prior to and during the vulcanizing step. By my invention I obtain such a bond.

I have described my invention in the manner in which I prefer to carry it out in practice under given requirements. I have also described other ways of practicing the invention under other requirements and conditions. It is clear that other specific embodiments of the invention might be practiced.

Upon this disclosure and description I claim the invention in both its broad and specific aspects.

Having thus described my invention, I claim:

1. The method of incorporating cords in a rubber sheet while being formed on a calender which consists in feeding the cords in spaced parallel relation under equalized tension to the rubber sheet on a calender roll with the cords and rubber travelling at the same speed, causing the cords to firmly contact with the rubber through a substantial arc, and then passing the cords and rubber between two calender rolls.

2. The method of embedding cords in rubber which consists in forming two rubber sheets on a calender, feeding the cords in spaced parallel relation under equalized tension to join one of the sheets on a calender roll, holding the cords against such sheet over a substantial arc and then passing the cords between the two rubber sheets and between the rolls of the calender to completely surround the cords with rubber.

3. The method of forming sheets of rubberized strain resisting material for tire building which consists in forming a heated sheet of tacky rubber on a calender, feeding uncoated cords in spaced parallel relation under equalized tension to the heated sheet, heating the uncoated cords sufficiently to have them quite hot as they meet the rubber, applying the heated cords to the rubber sheet on the calender roll over a sufficient arc to insure good contact, and then feeding the cords with the rubber sheet between the two calender rolls.

4. The method of embedding cords in rubber which consists in feeding hot cords in spaced parallel relation to a hot sheet of rubber on a calender roll for contact with said sheet over a substantial arc, and then, while maintaining the cords and rubber hot, feeding said sheet with the cords adhering thereto and with a second sheet of hot rubber to cover the cords on the first sheet between two calender rolls to form a composite sheet.

5. The method of joining cords and rubber which consists in feeding cords in parallel relation against the rubber on one of two calender rolls, causing a pressure of the cords against the rubber and then passing the rubber and cord into the bight of and between the two calender rolls.

6. The method of joining cords and rubber which consists in heating unrubberized cords and while hot feeding them in parallel relation against the hot calendered rubber on one of two calender rolls, causing a pressure of the unrubberized cords against the rubber and then passing the rubber and cord into the bight of and between the two calender rolls.

7. The method of joining unconnected cords by rubber on a calender which consists in feeding the cords and rubber to the bight of and between the calender rolls from a curved path on the surface of one of the rolls and pressing the cords against the rubber on said path before the cords and rubber meet the pressure of the two calender rolls.

8. The method of joining unconnected cords by rubber to make a composite sheet of predetermined proportions and relative positions of cords and rubber which consists in feeding the cords between two rubber sheets of predetermined gauge on a calender so that the cords and rubber will be finally pressed together and joined between the calender rolls and positioning the cords for the final pressure by first feeding them in the exact and desired relative positions to one of the rubber sheets on the calender and so fixing them upon said sheet just before they are subjected to said final pressure and performing said operations simultaneously upon successive portions of the rubber and cords to form the composite sheet in substantially one operation.

9. The method of positioning parallel unconnected cords in a rubber sheet between calender rolls without relative displacement of the cords one to another which consists in fixing the cords in their desired relative positions by a preliminary pressure of the cords against a tacky sheet on one of the calender rolls as it is turning to carry the cords and rubber sheet between the calender rolls and then pressing the cords and rubber for more intimate association between the calender rolls.

10. An apparatus for joining cords and rubber comprising in combination a calender to sheet out rubber, cord feeding means and means to apply the cords to the rubber sheet on a calender roll and fix them in position thereon before the rubber and cord enter the bight between two of the calender rolls.

11. An apparatus for joining cords and rubber comprising in combination a calender to sheet out rubber, a grooved roll to hold the cords in proper relative position as they are fed to the calender, said roll being mounted close to the calender roll carrying the rubber sheet and far enough away from the bight between the calender rolls to apply the cords to the rubber over a sufficient arc to insure a secure hold on the cords as they enter between calender rolls for final pressure.

12. An apparatus for joining cords and rubber comprising in combination a calender, a cord feeding device for the calender adjustably arranged across the face of one of the calender rolls and including a grooved roll to guide cords to the calender and means adjacent the grooved roll to hold the cords in staggered relation as they are fed to the grooved roll.

13. An apparatus for joining cords and rubber comprising in combination a calender, a cord guide roll arranged closely adjacent and across the face of one of the calender rolls and means to drive said guide and calender rolls at the same peripheral speed.

14. An apparatus for joining cords and rubber comprising cord heating means, a calender to sheet out hot rubber and a device between the heating means and calender to arrange the hot cords in their exact desired relative relation one to the other, and operable to press the cords in such relation against the rubber on a calender roll before the cords with the rubber are fed to the bight of the calender rolls.

15. An apparatus for joining cords and rubber comprising in combination three adjacent calender rolls, one adjacent pair being adapted to sheet out rubber stock and the other adjacent pair being adapted to press cords into said sheet, a cord guide roll arranged across the face of that calender roll common to the two pairs and adapted to locate the cords on a rubber sheet on said roll, and means for adjusting the pressure of the guide roll against the calender roll.

16. An apparatus for joining cords and rubber comprising a roll adapted to support a rubber sheet, a grooved cord guide roll adapted to receive each cord in a separate groove and press them against the rubber sheet, and a pair of preliminary guiding grooved rolls having their grooves more widely spaced than the first roll and adapted to supply the cords to the first roll in two sheets.

17. An apparatus for joining cords and rubber comprising a four roll calender arranged to form two sheets of rubber one between each of two respective sets of calender rolls and to press such sheets together, means to guide and press unconnected cords in parallel relation against the rubber sheet on one of said calender rolls and means to change the pressure with which the two sheets are forced together, the pressure exerted on the rubber by the cord guiding means, and the gauge of the rubber sheets all independently of each other and during the operation of the apparatus.

THOMAS MIDGLEY.

DISCLAIMER 1,742,777.—*Thomas Midgley*, Hampden, Mass. METHOD AND APPARATUS FOR INCORPORATING CORDS IN RUBBER SHEETS. Patent dated January 7, 1930. Disclaimer filed November 21, 1936, by the assignee, *The Fisk Rubber Corporation*.

Hereby enters this disclaimer to claim 15 of the specification.
[*Official Gazette December 8, 1936.*]

the rubber on a calender roll before the cords with the rubber are fed to the bight of the calender rolls.

15. An apparatus for joining cords and rubber comprising in combination three adjacent calender rolls, one adjacent pair being adapted to sheet out rubber stock and the other adjacent pair being adapted to press cords into said sheet, a cord guide roll arranged across the face of that calender roll common to the two pairs and adapted to locate the cords on a rubber sheet on said roll, and means for adjusting the pressure of the guide roll against the calender roll.

16. An apparatus for joining cords and rubber comprising a roll adapted to support a rubber sheet, a grooved cord guide roll adapted to receive each cord in a separate groove and press them against the rubber sheet, and a pair of preliminary guiding grooved rolls having their grooves more widely spaced than the first roll and adapted to supply the cords to the first roll in two sheets.

17. An apparatus for joining cords and rubber comprising a four roll calender arranged to form two sheets of rubber one between each of two respective sets of calender rolls and to press such sheets together, means to guide and press unconnected cords in parallel relation against the rubber sheet on one of said calender rolls and means to change the pressure with which the two sheets are forced together, the pressure exerted on the rubber by the cord guiding means, and the gauge of the rubber sheets all independently of each other and during the operation of the apparatus.

THOMAS MIDGLEY.

DISCLAIMER 1,742,777.—*Thomas Midgley*, Hampden, Mass. METHOD AND APPARATUS FOR INCORPORATING CORDS IN RUBBER SHEETS. Patent dated January 7, 1930. Disclaimer filed November 21, 1936, by the assignee, *The Fisk Rubber Corporation*.

Hereby enters this disclaimer to claim 15 of the specification.
[*Official Gazette December 8, 1936.*]